Patented Feb. 22, 1927.

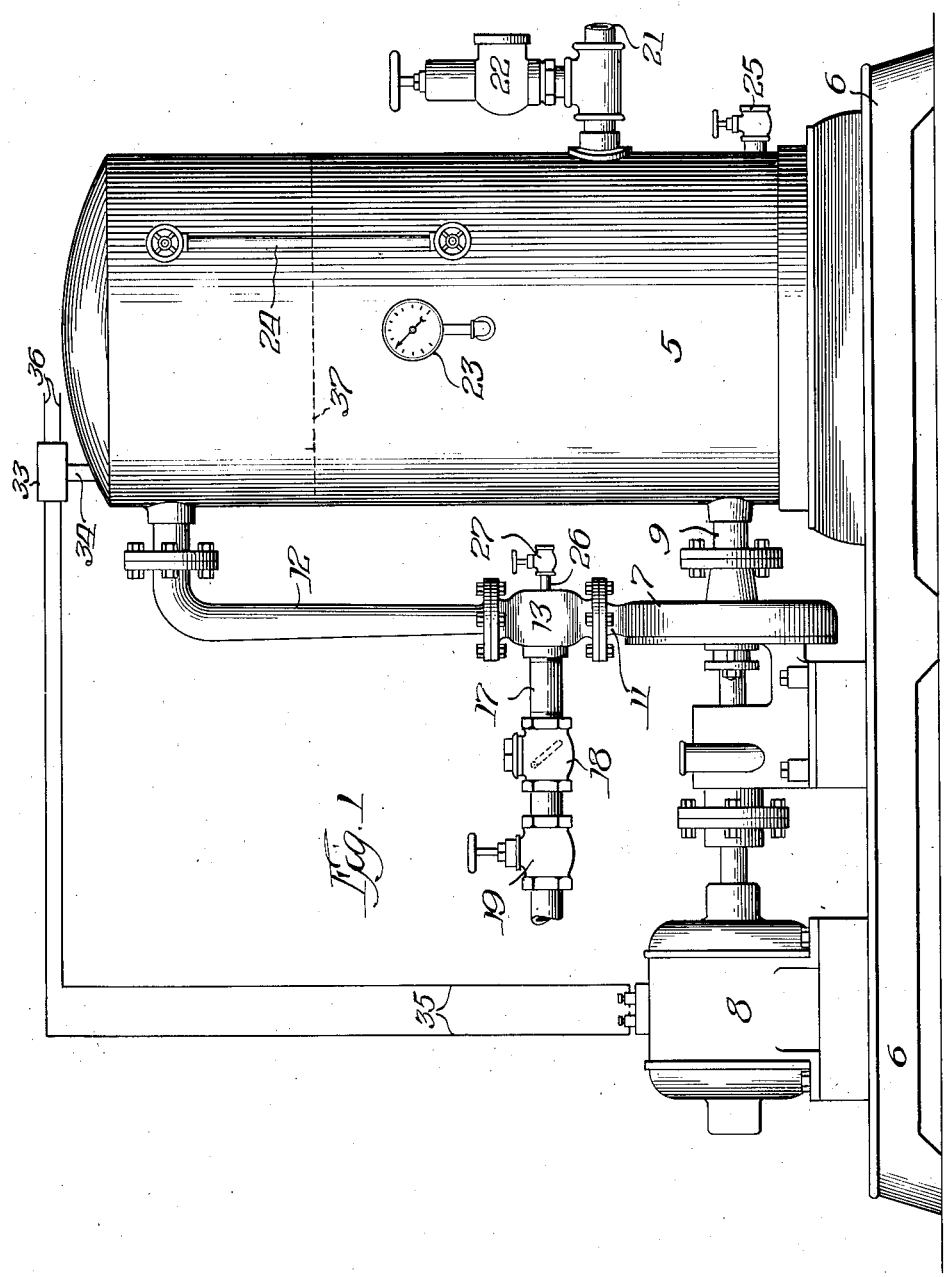

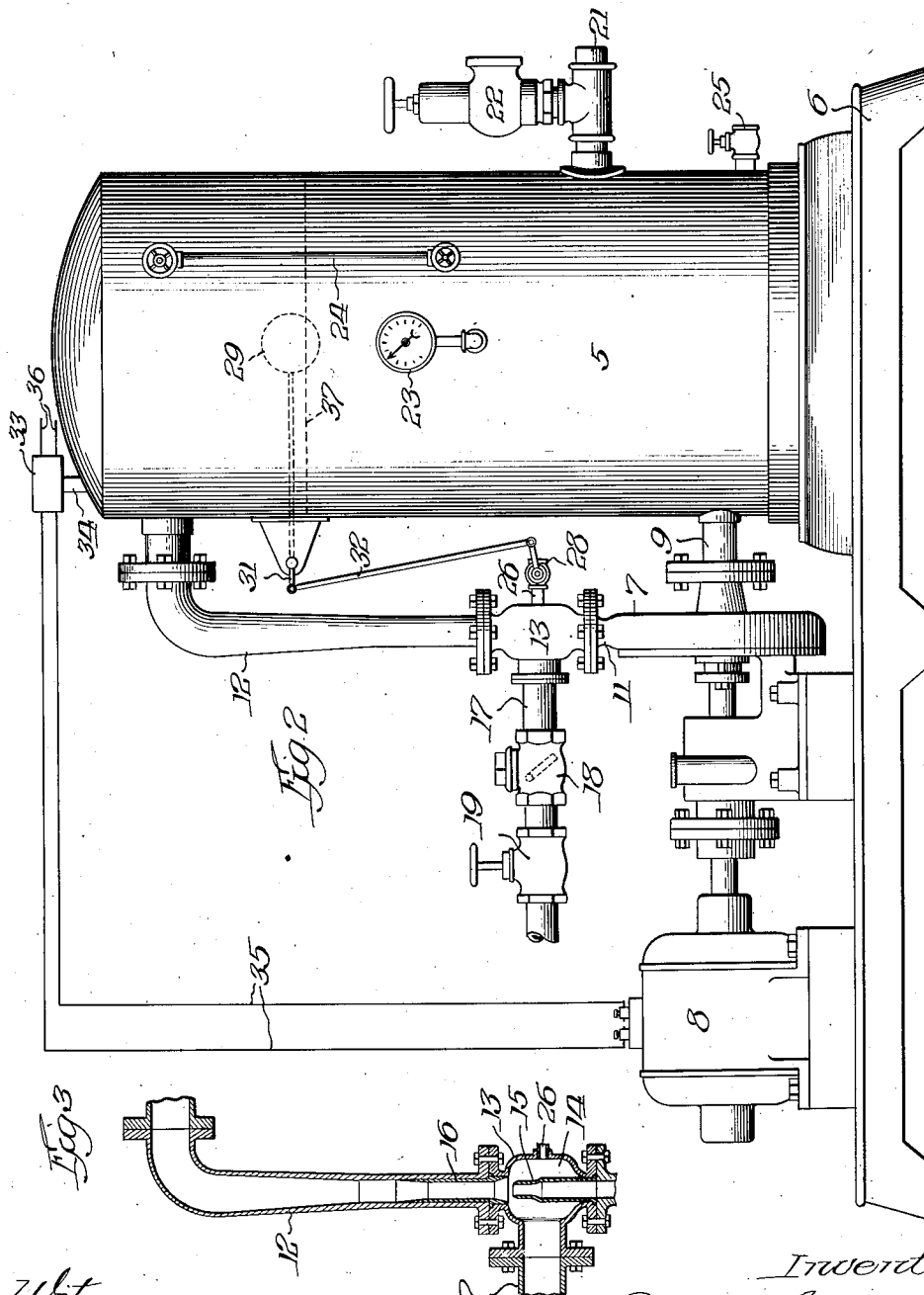

1,618,258

UNITED STATES PATENT OFFICE.

HOWARD A. YOUNG, OF CHICAGO, ILLINOIS.

WATER-PRESSURE SYSTEM.

Application filed November 10, 1924. Serial No. 749,071.

This invention pertains to pressure systems generally, and while the principles thereof may be employed for a variety of purposes, the specific embodiment of the invention herein illustrated and described is designed particularly for supplying water under pressure for household, factory, or other desired purposes. Furthermore, while I refer to the liquid as water, it should be understood that my invention contemplates the maintenance of a supply of any desired liquid under any desired pressure.

In the maintenance of a supply of water or other liquid under pressure for household purposes, for instance, in localities where pressure from the city mains is unavailable, it is the practise to either pump the water into a tank located at a sufficient elevation to give the desired pressure or to pump the water into a tank partially filled with air, which is compressed as the water is forced into the tank and because of its elasticity, serves to force the water out again under pressure for use. The air in such a tank, however, is gradually absorbed by the water with the result that the tank must, at intervals, be partially drained and opened to the atmosphere to permit the entrance of a supply of air from atmosphere sufficient to maintain the tank under pressure.

One of the primary purposes of my present invention is to obviate the expense and inconvenience attendant upon the construction and operation of systems of the character above indicated by providing a system which, per se, is capable of maintaining automatically a supply of water under a substantially uniform and predetermined pressure.

Another object is to provide an apparatus of the character indicated which will be simple in construction, economical to manufacture and install, and one which will be efficient in operation and require a minimum of attention and repairs, and which can be employed to produce and maintain extremely high pressures if required and any lower pressures that may be desired.

For the purpose of facilitating an understanding of my invention, I have illustrated on the accompanying drawings, a preferred embodiment, from an inspection of which, when considered in connection with the following description, my invention and many of its inherent advantages should be readily understood and appreciated.

Referring to the drawings:—

Fig. 1 is a side elevation of a system constructed in accordance with my invention, Fig. 2 is a similar view of a full automatic system, and, Fig. 3 is a fragmentary sectional view of a detail.

By reference to the drawings and particularly Figures 1 and 2 thereof, it will be observed that my apparatus comprises a closed tank 5 adapted to contain fluids such as water and air under pressure. The tank is preferably mounted upon a base 6 which also forms a supporting base for the centrifugal pump 7 and its driving motor 8, the base being employed so that the whole assembly will constitute a unit.

The intake side of the pump 7 is connected by a pipe or conduit 9 with the interior of the tank near its bottom end. The discharge side 11 of the pump is connected by a pipe or conduit 12 with the interior of the tank near its upper end. A closed circulating circuit is therefore established through which water or other liquid is withdrawn from the lower portion of the tank and returned to the upper portion thereof. In this circuit, between the discharge side of the pump and the upper portion of the tank, there is interposed a suction producing device, indicated generally by reference character 13 and comprising, as best shown in Figure 3, a casing providing a suction chamber 14 into which extends a discharge nozzle 15 from the pump, adapted to deliver into a venturi 16 extending upwardly into the pipe 12. This suction device, acting upon the injector principle, creates, as the water is delivered from the pump, a suction or partial vacuum in the chamber 14.

A water supply pipe 17 communicates with one side of the chamber 14, this pipe being connected at its other end with any available source of water supply. A check valve 18 interposed in the pipe 17 prevents pressure from backing up into the pipe 17, and a hand valve 19 in the pipe may be employed to shut off the pipe 17, should occasion require.

The water is delivered from the tank under pressure through a delivery pipe 21 which conducts the water to where it may be desired for use, and this pipe is equipped with a pressure relief valve 22 of well-known or preferred construction which insures against injury to the apparatus, such as might result from an accumulation of excessive pressure within the tank. The tank is equipped with the usual pressure gauge 23, sight glass 24, and a drain cock 25.

The shell 13 of the suction device is provided preferably on the side opposite to the water supply pipe 17, with an air intake pipe 26 which, in the form of the invention shown in Figure 1 is equipped with a hand valve 27, and in the form of the invention shown in Figure 2, with a shut-off valve 28 adapted to be automatically opened and closed by means of a float 29 disposed within the tank and operating through a lever 31 and a link 32.

The operation of the motor is controlled from a pressure controlled switch 33 of any preferred construction, the switch being in communication with the tank through a connection 34, and being connected with the motor by wires 35, the power wires 36 being connected with the switch box in any well-known manner.

When my apparatus is to be operated, it is first partially filled with water substantially to the level indicated by the dotted line 37. This insures automatic priming of the pump, and since the delivery pipe 21 is connected to the tank some distance above the pump intake, it will be manifest that the pump will always be primed since the water level in tank cannot fall below the level of the pump intake unless the drain cock be opened. The motor being started by the pressure controlled switch, water will be withdrawn from the lower portion of the tank and delivered by the pump through the suction producing device which will impose a suction upon the chamber 14, thereby inducing a flow of water from the supply pipe 17, which water, by reason of the injector action will be delivered through the pipe 12 into the tank. Initially, there will be a considerable quantity of air in the tank which will be trapped at its upper end above the water level, and when this pressure rises to the point for which the pressure controlled switch is set, the motor will be automatically shut off. As water is withdrawn for use from the pipe 21 the pressure in the tank will fall, thereby causing the closing of the switch 33 to stop the motor and set the pump in operation. As the quantity of air trapped above the water level diminishes during operation of the machine, this fact will be apparent to an observer through the sight glass, and in the form of the invention shown in Figure 1, the air will be replenished by manually opening the valve 27 so that an inflow of air into the chamber 14 will result, which air will be delivered together with the inflowing water through the pipe 12 into the tank. When the water level in the tank has been reduced to the desired point, the valve 27 may be closed.

The form of the invention shown in Figure 2 is entirely automatic in its operation, since the valve 28 in this instance is automatically opened and closed by the rising and falling of the water level in the tank, this result being accomplished by means of the float 29 acting through the intermediate connections to the valve 28.

It will be obvious that by means of my invention, a quantity of water or other liquid may be maintained in the tank for use under any desired pressure and by setting the release valve 22, this pressure may be maintained at any desired height. It will be manifest that an extremely high pressure can be secured and maintained in the tank if desired, because the same pressure always exists at both the points of connection of the pump with the tank, and since the pump will operate irrespective of the pressure in the tank to introduce more water into the tank and more air also if the air valve be opened, the amount of pressure which may be induced and maintained in the tank is limited only by the strength of the materials of which the apparatus is constructed.

It is believed that my invention, its construction, mode of operation and many of its inherent advantages will be understood and appreciated without further description and while I have shown and described a preferred embodiment, obviously the details may be varied within wide limits without departing from the essence of the invention as defined in the following claims.

I claim:

1. A water pressure system comprising, a closed tank adapted to hold water under pressure, and means including a closed water circulating circuit for inducing additional water and air in regulated quantities into the tank.

2. A water pressure system comprising, a tank adapted to hold water under pressure, means for circulating water from the lower portion to the upper portion of said tank, means actuated by said circulating water for inducing a flow of water and air into the system, and means for regulating the quantity of air induced.

3. A water pressure system comprising, a closed tank adapted to contain water and air under pressure, a pump connected with the lower portion of said tank, a connection between the discharge side of said pump and the upper portion of said tank, a suction device interposed in said connection, a water supply pipe connected with said suction device, and means for admitting air in regulated quantities to said suction device.

4. A water pressure system comprising, a closed tank adapted to contain water under air pressure, means including a closed water circulating circuit for inducing additional water and air into said tank, means controlled by the pressure in the tank for replenishing the water therein, and means for automatically maintaining a predetermined quantity of air under pressure in said tank.

5. In a water pressure system the combination of a closed tank adapted to contain water under air pressure, means including a closed water circulating circuit connecting the upper and lower portions of the tank for inducing additional water and air therein, and means for automatically maintaining a predetermined water level and air pressure in said tank.

6. In a water pressure system the combination of a closed tank adapted to contain water under air pressure, means for withdrawing water from the lower portion of the tank and returning it to the upper portion thereof, said means including a pump and a suction device interposed in the connection between the discharge side of the pump and the upper portion of the tank, a water supply pipe connected with said suction device, and means for admitting air in regulated quantities to said suction device to maintain a predetermined volume of air under pressure in the tank.

7. In a water pressure system the combination of a closed tank adapted to contain water under air pressure, a water delivery pipe from said tank, means operating under the pressure in the tank for replenishing the water in the tank by an injector action, and means controlled by the water level in the tank for replenishing the air in the tank.

8. In a water pressure system the combination of a tank adapted to contain water and air under pressure, a pressure relief valve connected with the tank, pressure controlled means operating under the pressure existing in the tank for replenishing the water in the tank by an injector action and for replenishing the air in said tank, and means for controlling the volume of air delivered to the tank.

9. In a water pressure system the combination of a tank adapted to contain water and air under pressure, a pump connected at its intake and discharge sides to the lower and upper portions respectively of the tank, an injector through which the discharge from the pump passes, water and air supply pipes connected with the suction side of said injector, a water delivery pipe connected with the tank, and pressure controlled means for starting and stopping said pump.

10. In a water pressure system the combination of a tank adapted to contain water and air under pressure, a rotatable pump connected at its intake and discharge sides with the lower and upper portions respectively of the tank, a water delivery pipe connected with the tank at a higher level than the pump intake connection, an injector through which the discharge from the pump passes, a water supply pipe and an air inlet communicating with the suction side of the injector and means for regulating the air entering the injector through said inlet.

HOWARD A. YOUNG.